US012695186B2

(12) United States Patent
Buduson et al.

(10) Patent No.: US 12,695,186 B2
(45) Date of Patent: Jul. 28, 2026

(54) WIDEBAND RADIO FREQUENCY DIRECTIONAL ANTENNA ADAPTOR

(71) Applicant: L3Harris Global Communications, Inc., Melbourne, FL (US)

(72) Inventors: James Buduson, North Chili, NY (US); Peter Burke, Hilton, NY (US); Barrett Bartell, Mendon, NY (US)

(73) Assignee: L3Harris Global Communications, Inc., Melbourne, FL (US)

( * ) Notice: Subject to any disclaimer, the term of this patent is extended or adjusted under 35 U.S.C. 154(b) by 128 days.

(21) Appl. No.: 18/436,622

(22) Filed: Feb. 8, 2024

(65) Prior Publication Data

US 2025/0260161 A1 Aug. 14, 2025

(51) Int. Cl.

| | |
|---|---|
| ***H01Q 3/01*** | (2006.01) |
| ***H01Q 3/16*** | (2006.01) |
| ***H01Q 13/18*** | (2006.01) |
| ***H01Q 15/16*** | (2006.01) |
| ***H01Q 19/04*** | (2006.01) |
| ***H01Q 19/10*** | (2006.01) |
| ***H01Q 19/13*** | (2006.01) |

(52) U.S. Cl.

CPC ............... *H01Q 3/16* (2013.01); *H01Q 13/18* (2013.01); *H01Q 15/16* (2013.01); *H01Q 19/04* (2013.01); *H01Q 19/106* (2013.01)

(58) Field of Classification Search

CPC .......... H01Q 1/1207; H01Q 3/01; H01Q 3/16; H01Q 13/18; H01Q 15/16; H01Q 19/04; H01Q 19/13; H01Q 19/30; H01Q 19/106; H01Q 19/108

See application file for complete search history.

(56) References Cited

U.S. PATENT DOCUMENTS

| | | | | |
|---|---|---|---|---|
| 3,383,694 A | | 5/1968 | Strohmeyer, Jr. | |
| 4,028,709 A | * | 6/1977 | Berkowitz ........... | H01Q 1/1228 343/894 |
| 5,061,944 A | * | 10/1991 | Powers .................. | H01Q 19/30 343/819 |
| 6,307,524 B1 | | 10/2001 | Britain | |
| 6,844,862 B1 | | 1/2005 | Cencich et al. | |
| 7,006,053 B2 | | 2/2006 | Zigler et al. | |

(Continued)

FOREIGN PATENT DOCUMENTS

| | | |
|---|---|---|
| JP | 4048825 | 2/2008 |
| KR | 20100089275 | 8/2010 |
| KR | 102580030 | 9/2023 |

*Primary Examiner* — Dimary S Lopez Cruz
*Assistant Examiner* — Marin Stoytchev Stoytchev
(74) *Attorney, Agent, or Firm* — Fox Rothschild LLP; Carol E. Thorstad-Forsyth

(57) ABSTRACT

An antenna system, comprising: an omni-directional antenna element; and a directional adapter having an electromagnetic reflector. The directional adapter detachably coupled to the omni-directional antenna element. The electromagnetic reflector being offset from the omni-directional antenna element. The directional adapter may be configured to be coupled to the antenna to convert a radiation pattern from an omni-directional antenna radiation pattern to a directional antenna radiation pattern, and configured to be decoupled from the antenna to convert the radiation pattern back into the omni-directional antenna radiation pattern.

12 Claims, 14 Drawing Sheets

(56) References Cited

U.S. PATENT DOCUMENTS

| | | | | |
|---|---|---|---|---|
| 7,388,559 | B1 | 6/2008 | Kim | |
| 8,144,070 | B2 * | 3/2012 | Wright | H01Q 1/08<br>343/815 |
| 8,963,774 | B1 * | 2/2015 | Livadaru | H01Q 3/446<br>342/374 |
| 10,098,018 | B2 | 10/2018 | Lysejko et al. | |
| 2003/0160730 | A1 * | 8/2003 | Alsliety | H01Q 19/30<br>343/795 |
| 2004/0217908 | A1 * | 11/2004 | Zigler | H01Q 1/12<br>343/757 |
| 2005/0026655 | A1 * | 2/2005 | Giaimo, III | H01Q 19/104<br>455/90.3 |
| 2007/0279308 | A1 * | 12/2007 | Olsen | H01Q 1/32<br>343/713 |

* cited by examiner

WIDEBAND RADIO FREQUENCY DIRECTIONAL ANTENNA ADAPTOR

BACKGROUND

Description of the Related Art

Radios use antennas. Some antennas have omnidirectional radiation pattern. Some antennas have a directional radiation pattern.

SUMMARY

This document concerns an antenna system. The antenna system comprises: an omni-directional antenna element; and a directional adapter having an electromagnetic reflector. The directional adapter is detachably coupled to the omni-directional antenna element. The electromagnetic reflector is offset from the omni-directional antenna element. The directional adapter has a director offset from the omni-directional antenna element and on the opposite side of the electromagnetic reflector. The directional adapter has a structural element disposed between the reflector and the omni-directional antenna element. The structural element is generally electromagnetically nonconductive. The directional adapter is detachably coupled indirectly to the omni-directional antenna element.

This document also concerns an antenna adapter. The antenna adapter comprises: a mechanical coupler attachable to an antenna; and an electromagnetic reflector offset from the coupler. The antenna adapter is configured to be coupled to the antenna to convert a radiation pattern from an omni-directional antenna radiation pattern to a directional antenna radiation pattern, and configured to be decoupled from the antenna to convert the radiation pattern back into the omni-directional antenna radiation pattern.

This document also concerns implementing systems and methods for operating an antenna. The methods comprise: using the antenna as an omni-directional antenna to radiate equal radio power in all directions perpendicular to a center axis of the antenna; converting the antenna into a directional antenna by coupling a directional adapter thereto; using the antenna, with the directional adapter coupled thereto, to radiate greater radio wave power in a specific direction; and converting the antenna back into the omni-directional antenna by decoupling the directional adapter therefrom.

BRIEF DESCRIPTION OF THE DRAWINGS

This disclosure is facilitated by reference to the following drawing figures, in which like numerals represent like items throughout the figures.

DETAILED DESCRIPTION

Figure 1:
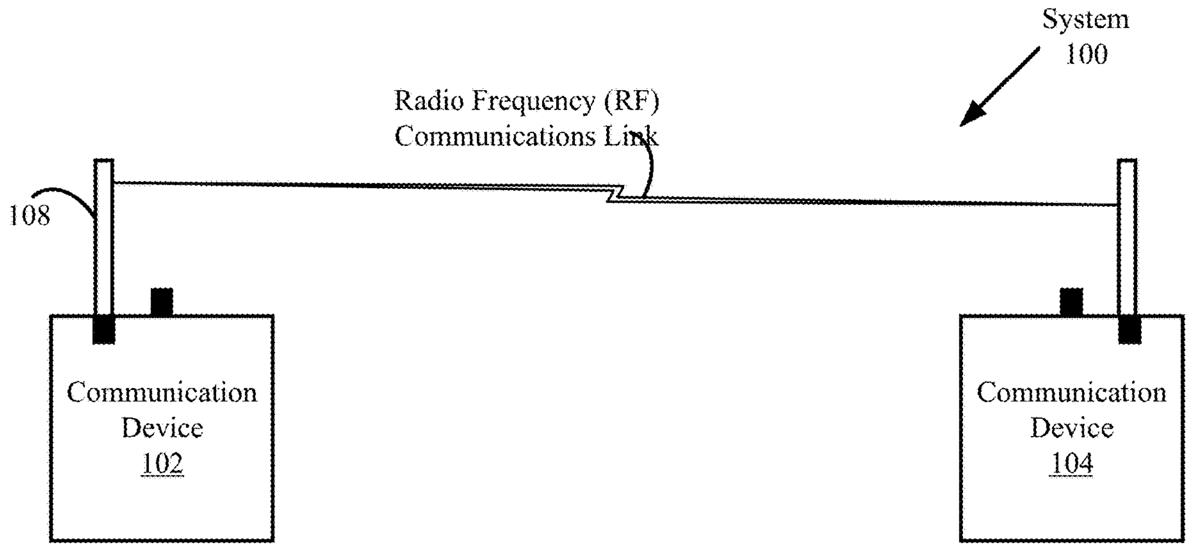
FIGS. 1-2 each provides an illustration of a communication system.
Figure 2:
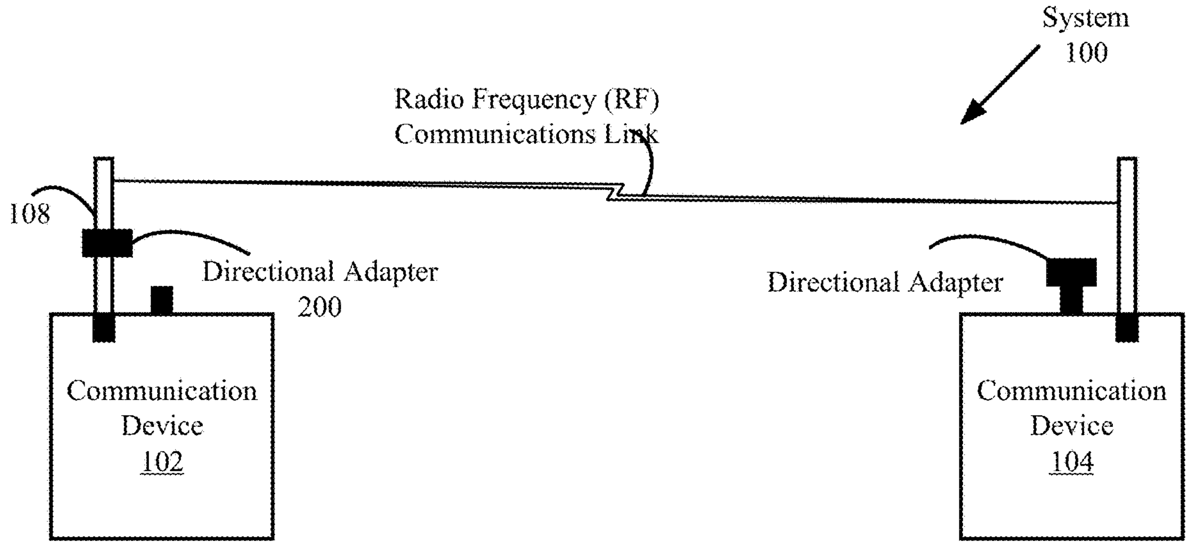
Figure 3:
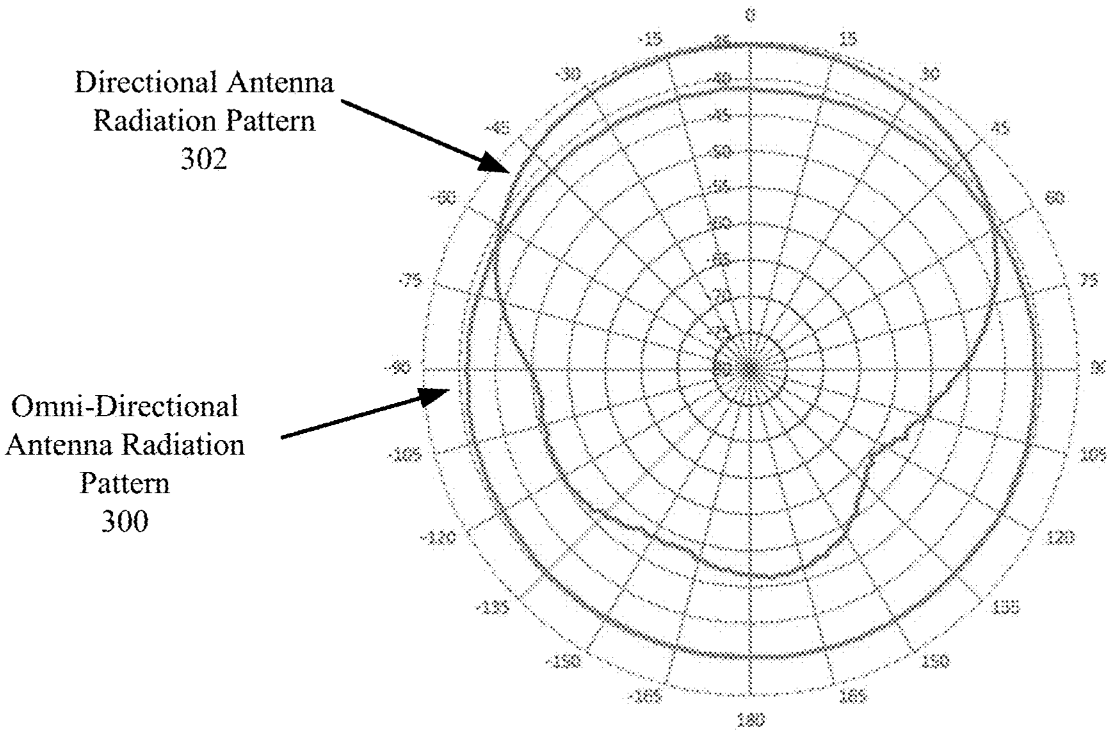
FIG. 3 shows an omni-directional antenna radiation pattern and a directional antenna radiation pattern.

A directional adapter 200 may be selectively attached and detached to/from the antenna(s) 108 of the communication device(s) 102, 104 as shown in FIGS. 1-2. This coupling can be a direct coupling to the antenna or an indirect coupling to the antenna. A coupler may be provided to facilitate the selective attachment of the directional adapter 200 to the antenna or another component of a communication device (e.g., a housing, a rotary knob, any other member protruding out and away from the housing) and the selective detachment of the directional adapter 200 from the antenna or the another component of the communication device. Any known or to be known coupler can be used here. For example, a spring-based clip, clamp, cord(s) and/or friction fit structure can be employed. The attachment of the directional adapter 200 causes the antenna 108 to transition from the omni-directional antenna mode to a directional antenna mode in which the antenna radiates greater radio wave power in a specific direction, as shown by the azimuth pattern 302 of FIG. 3.

The directional adapter 200 comprises a passive component near the antenna to reflect and/or direct the radiation pattern. The shape, size and spacing of the directional adapter 200 are configured to allow for efficient operation across the effective bandwidth of the antenna 108. The directional adapter 200 is a portable, compact, removable, light weight and inexpensive accessory for the antenna.

The directional adapter 200 can have an overall structure to convert the antenna 108 into a yagi antenna, a parabolic antenna, a reflector antenna, a horn antenna, a corner reflector antenna, and/or a cavity antenna. The particulars of such adapter structures will now be discussed in detail in relation to FIGS. 4-9.

FIG. 4 provides an illustration of an adapter structure 400 configured to convert or otherwise transform an omni-directional antenna (e.g., antenna 108 of FIGS. 1-2) into a yagi antenna. A top view of the adapter structure 400 is provided in FIG. 4A, and a front view of the adapter structure 400 is provided in FIG. 4B.

The adapter structure 400 comprises a coupler 402 connected or otherwise attached to a main body 404. The coupler 402 is configured to facilitate the selective coupling and decoupling of the adapter structure 400 to an antenna (e.g., omni-directional antenna 108 of FIG. 1). The coupler 402 can include, but is not limited to, a friction fit structure, a clamp, cord(s) and/or a clip designed to receive and hold the omni-directional antenna in an internal space 416. The coupler 402 may be formed of an insulating material. The insulating material can include, but is not limited to, plastic and/or rubber. One or more optional protrusions 490 and/or detents 492 may be provided on an internal surface of the coupler 402 to facilitate the coupling of the adapter structure 400 to an antenna and/or maintain the coupling throughout use of the adapter structure. The protrusion may be configured to use suction to adhere to the omni-directional antenna.

The main body 404 comprises a support member 408 to which one or more passive components are mounted. The support member 408 may formed of an insulating material which is the same or different than the insulting material of the coupler 402. In some scenarios, the support member 408 and coupler 402 are integrally formed as a single piece, for example, via an injection molding process. In other scenarios, the support member 408 and coupler 402 are two separate pieces that are joined, attached, adhered and/or affixed to each other. A weld or an adhesive may, for example, be used to facilitate the coupling of the support member 408 and coupler 402.

The passive component(s) include(s) a reflector 414. The reflector is provided to add gain by reflecting the energy produced at the drive antenna (e.g., antenna 108 of FIG. 1) and cause electromagnetic waves to propagate in a particular direction. One or more directors 410, 412 may optionally also be provided as passive components. The reflector 414 may be formed of a conductive material. The directors 410, 412 may be formed of a conductive material. Each director is provided to modify the radiation pattern of the radio waves that hits it and re-radiate the radio waves with a different phase. An illustration showing the adapter structure without any directors is provided in FIG. 4D. An illustration showing the adapter structure with one director is provided in FIG. 4E. An illustration showing the adapter structure with two adapters is provided in FIGS. 4A-4B. The adapter structure can include any number of directors selected in accordance with a particular application.

The reflector 414 is larger in size than the directors 410, 412. The directors 410, 412 are equal in size. In this regard, the reflector 414 may have a length l1, width w1 and/or height h1 larger than the length l2, width w2 and/or height h2 of the director(s). The lengths l1, l2, heights h1, h2 and widths w1, w2 are parameters of the adapter structure 400 which are selected to tune the frequency in which the adapter structure 400 is able to operate while coupled to the drive antenna (e.g., antenna 108 of FIG. 1). The frequency of the adapter structure 400 can also be tuned by changing the distance D1 between adjacent directors 410-412, the distance D2 between the coupler 402 and the adjacent director 412, and/or the distance D3 between the coupler 402 and the reflector 414.

Figure 4A:
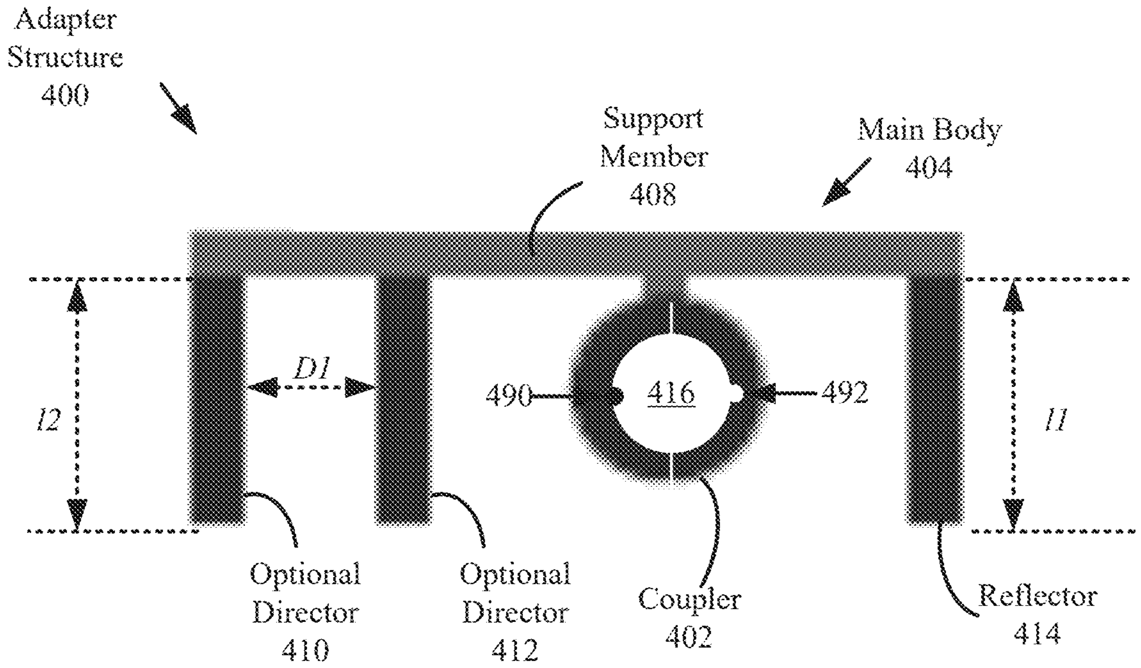
FIGS. 4A-4G (collectively referred to herein as "FIG. 4") provide illustrations of adapter structure(s).
Figure 4B:
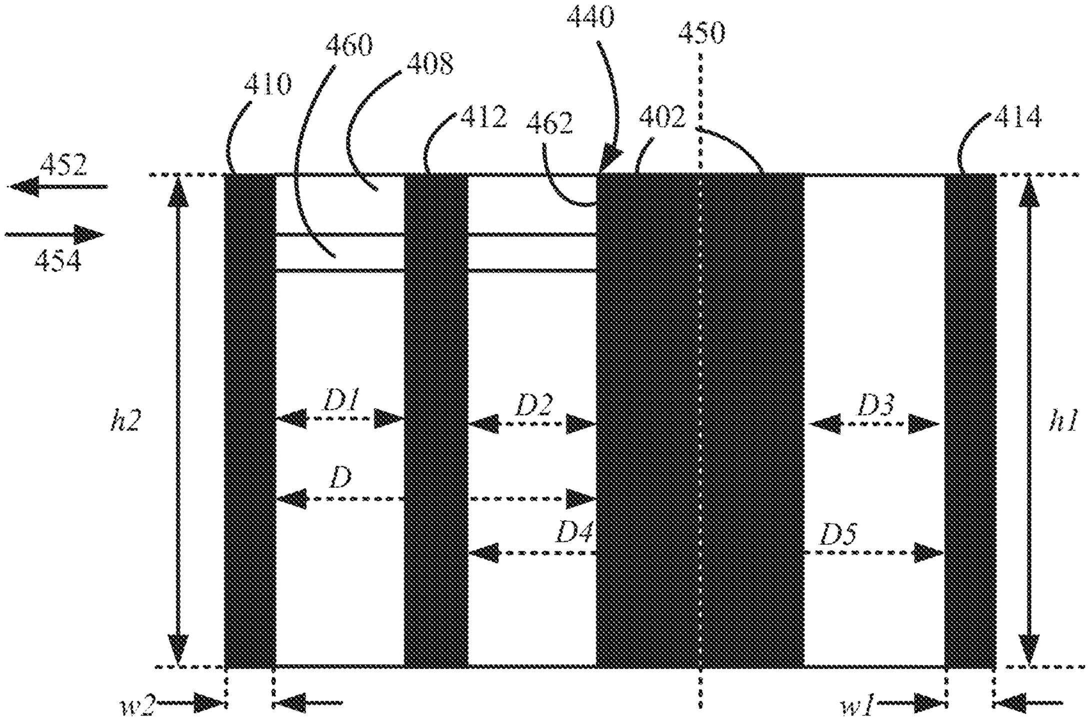
Figure 4C:
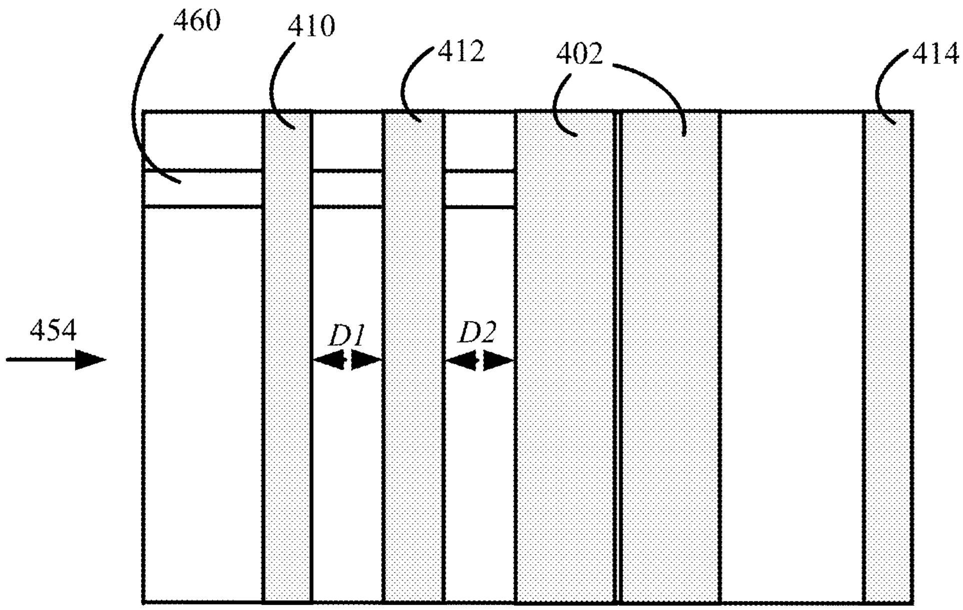
Figure 4D:
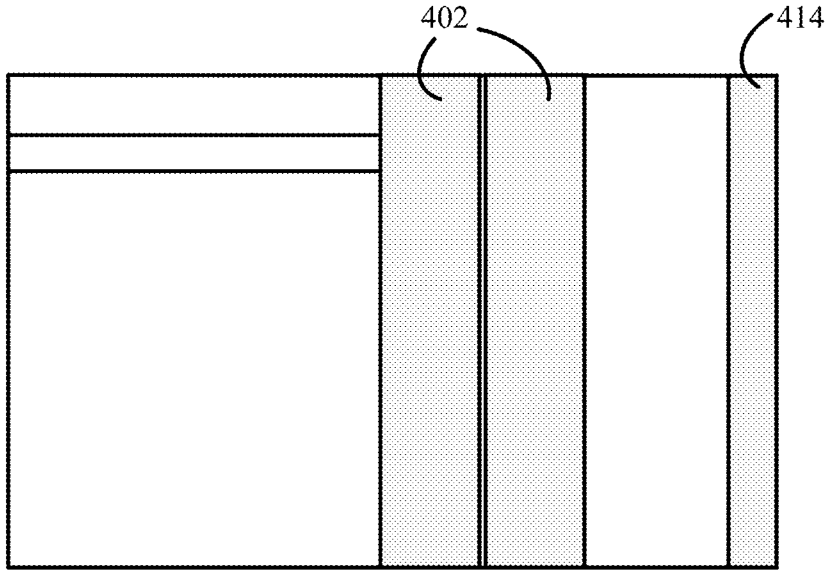
Figure 4E:
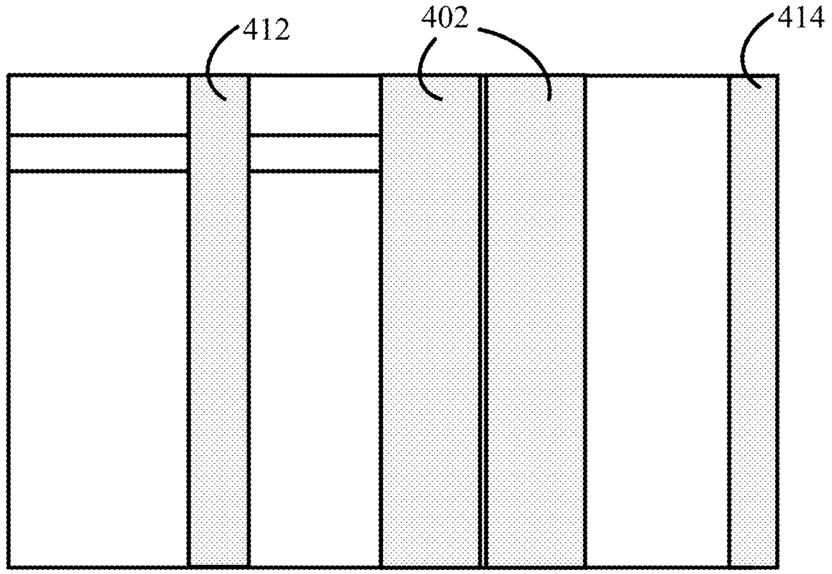
Figure 4F:
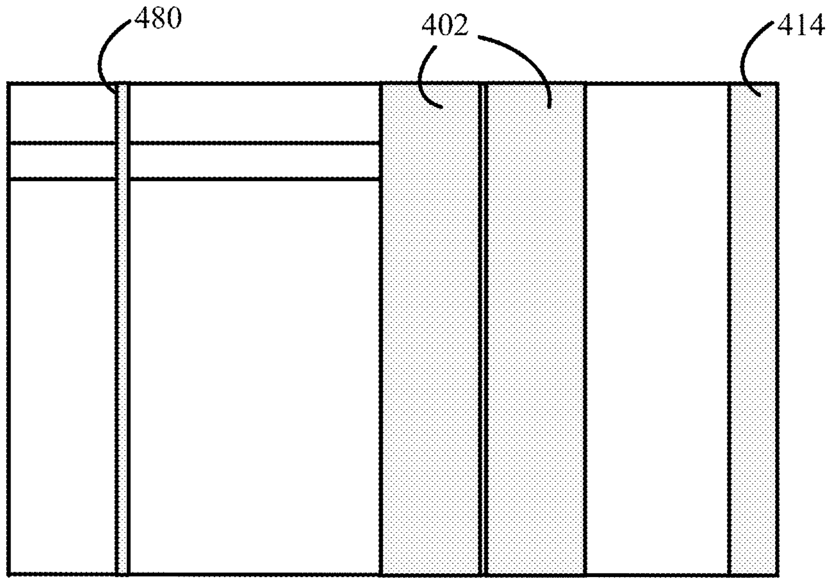
Figure 4G:
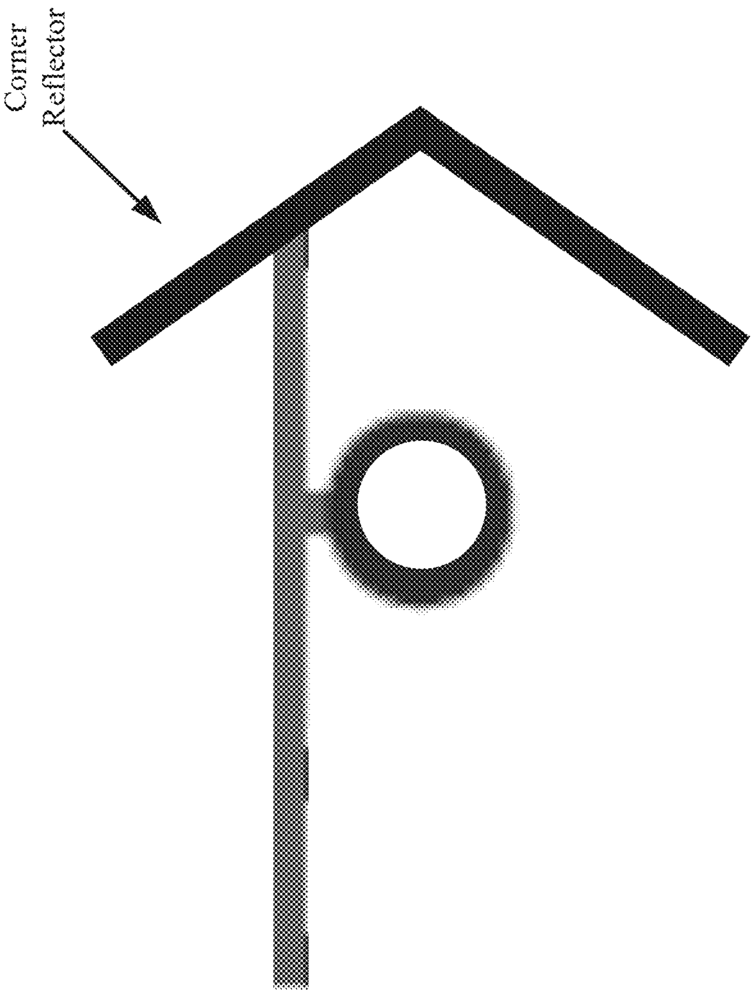

The reflector 414 has a fixed position relative to the support member 408. In contrast, each director 410, 412 can have a fixed position relative to the support member 408 or alternatively a variable position relative to the support member 408. In the variable position scenario, the director(s) may be slid in an optional track 460 formed in the support member 408 or otherwise move in opposing directions 452, 454 so as to change distance D1 and/or distance D2. An illustration is provided in FIG. 4C showing the directors 410, 412 moved in direction 454 so as to decrease distances D1 and D2. This allows for frequency tuning and/or antenna radiation pattern adjustments in the field by a user of the adapter structure 400.

The reflector 414 may additionally or alternatively be interchangeable with reflectors having different sizes and/or shapes. An illustration showing the reflector 414 inter changed with a corner reflector is provided in FIG. 4G.

Each director 410, 412 may be selectively attachable/detachable to/from the support member 408, and/or may be interchangeable with other director(s) having different size(s) than directors 410, 412. An illustration showing the adapter structure with the directors 410, 412 replaced with a different sized director 480 is provided in FIG. 4F.

The components 410, 412, 414 are arranged so as to be spaced apart from each other. Adjacent directors 410 and 412 are spaced apart from each other by a distance D1. Although two directors are shown in FIG. 4, the present situation is not limited in this regard. In the case that three or more directors are provided with the adaptor structure, each pair of adjacent directors are spaced apart from each other by the same distance as that of all other pairs of adjacent directors.

The distance D2 from the inner most director 412 to the coupler 402 is the same as distance D1. However, distance D3 between the coupler 402 and the reflector 414 can be the same as or different than distances D1 and D2. The distance between the inner most director 412 and the center axis 450 of the coupler 402 can be the same as or different than the distance between the reflector 414 and the center axis 450.

As shown in FIG. 4, an edge 462 of the coupler 402 is aligned with a center 440 of the adapter structure 200. The coupler 402 extends from the center 440 in direction 454 towards the reflector 414. The present solution is not limited in this regard. In other scenarios, such as when the adapter structure comprises a single director, a center axis 450 of the coupler 402 may be aligned with the center of the adapter structure 200. The coupler 402 is shown in FIG. 4 as having the same height as the reflector and/or directors. The present solution is not limited in this regard. The coupler can alternatively have a different height than the reflector and/or director(s).

Figure 5:
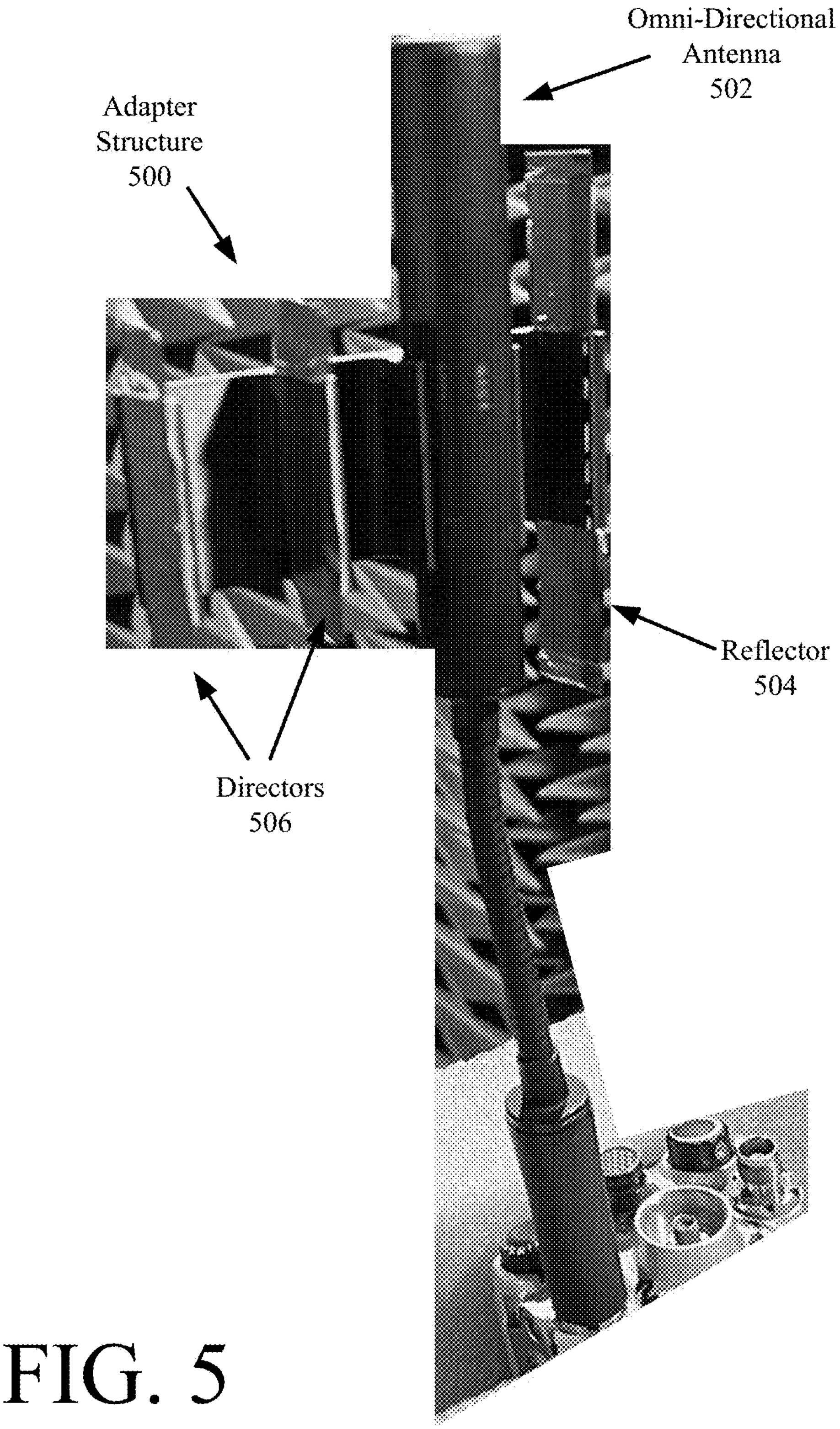
FIG. 5 provides an illustration of an adapter structure of the type shown in FIG. 4 coupled to an omni-directional antenna.

An illustration is provided in FIG. 5 showing a directional adaptor 500 coupled to an omni-directional antenna 502. The adapter structure 500 is configured to convert or otherwise transform an omni-directional antenna 502 into a yagi antenna. The directional adaptor 500 has a structure similar to the adapter structure 400 of FIG. 4. The reflector 504 of directional adaptor 500 has an overall size that is different than the overall size of each director 506.

FIG. 6 provides an illustration of another structure 600 for a directional adaptor. A top view of the adapter structure 600 is provided in FIG. 6A, and a front view of the adapter structure 600 is provided in FIG. 6B.

The adapter structure 600 is configured to convert or otherwise transform an omni-directional antenna (e.g., omni-directional antenna 108 of FIG. 1) into a reflector antenna. Accordingly, the adapter structure 600 comprises a coupler 602 configured to facilitate the coupling and decoupling of the adapter structure 600 to an antenna (e.g., antenna 108 of FIG. 1). Coupler 602 may be the same as, similar to or different than coupler 402 of FIG. 4.

At least one support member 604 is provided to attach the coupler 602 to a reflector 608. The reflector 608 is provided to add gain by reflecting the energy produced at the drive antenna (e.g., omni-directional antenna 108 of FIG. 1) and send it in a particular direction. The reflector 608 may be formed of a conductive material and have a generally planar shape.

The coupler 602 and support member(s) 604, 606 are formed of insulative material(s). In some scenarios, the support member(s) 604, 606 and coupler 602 are integrally formed as a single piece, for example, via an injection molding process. In other scenarios, the support members 604, 606 and coupler 602 are separate pieces that are joined, attached, adhered and/or affixed to each other. A weld or an adhesive may, for example, be used to facilitate the coupling of the support member(s) 604, 606 and coupler 602.

The length, height and width of the reflector 608 are selected to tune the frequency in which the adapter structure 600 is able to operate while coupled to the drive antenna (e.g., antenna 108 of FIG. 1). In some scenarios, the reflector 608 may have a fixed size or a variable size. The reflector may also be interchangeable with other different sized reflectors. The frequency of the adapter structure 600 can also be tuned by changing the distance D6 between the coupler 602 and the reflector 608.

Distance D6 is selected based on the frequency in which the directional adapter is to operate. The distance D6 can be smaller or larger than that shown in FIG. 6. Nominally the distance D6 may be equal to or substantially similar to ¼λ. The distance D6 may be fixed or alternatively adjustable. In the adjustable scenario, the distance D6 can be changed by expanding and/or contracting the support members 604, 606.

Figure 6A:
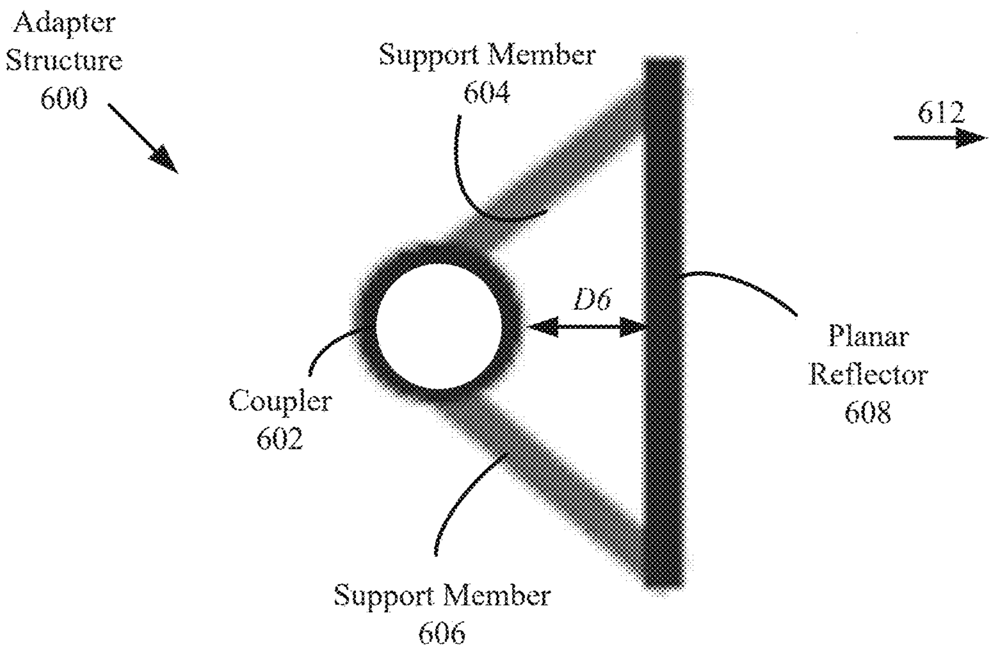
FIGS. 6A-6D (collectively referred to herein as "FIG. 6") provide illustrations showing another adapter structure.
Figure 6B:
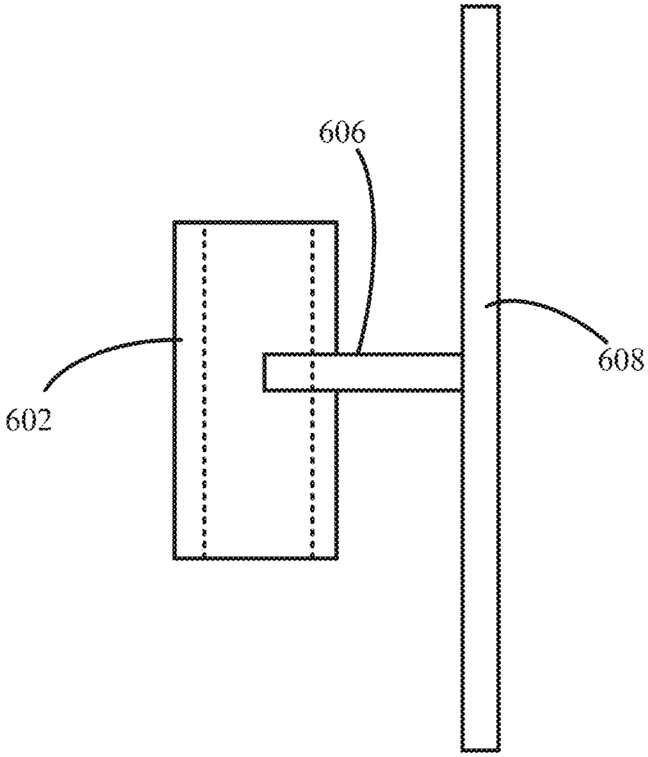
Figure 6C:
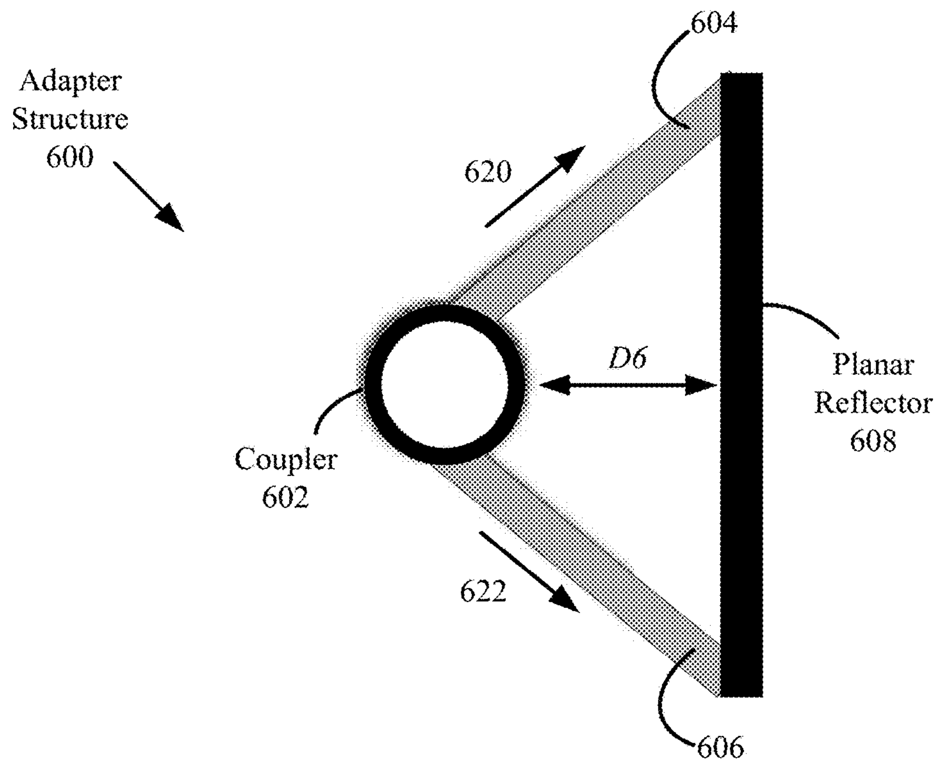
Figure 6D:
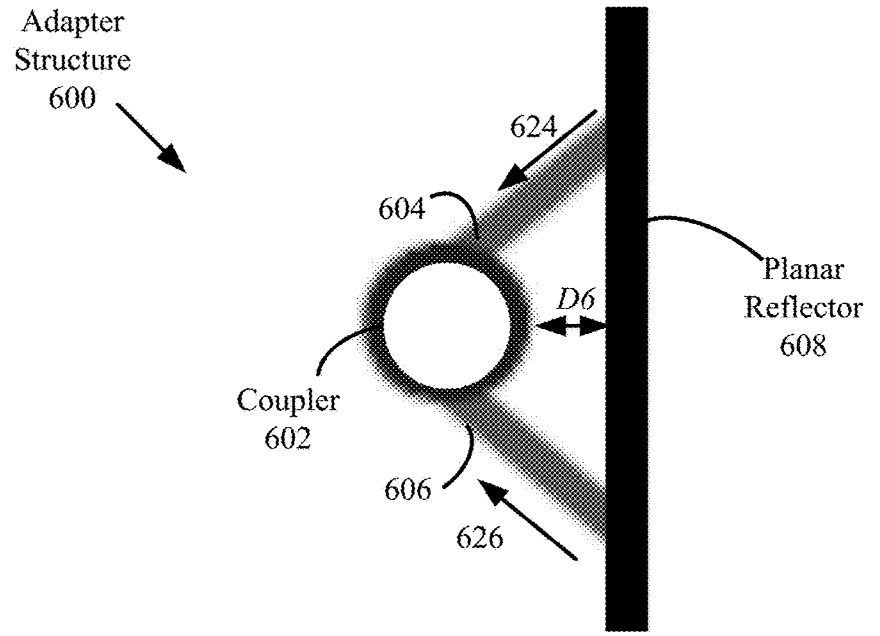

The expansion/contraction of the support members 604, 606 can be facilitated by using a structure in which the support member sub-parts can slide into and out of each other. The structure can include, but is not limited to, a telescoping structure. The support members 606, 604 are expanded by increasing their lengths respectively in directions 620, 622 as shown in FIG. 6C. In this case, the size of the planar reflector 608 may be changed as also shown in FIG. 6C. The present solution is not limited in this regard. In other scenarios, a single central support structure is provided that can be expanded without requiring the size of the reflector to change. Thus, the variable size of the reflector is an optional feature of the adapter structure. The support members 606, 604 may be contracted by decreasing their lengths respectively in directions 624, 626 as shown in FIG. 6D. The present solution is not limited to the particulars of these scenarios.

Figure 7A:
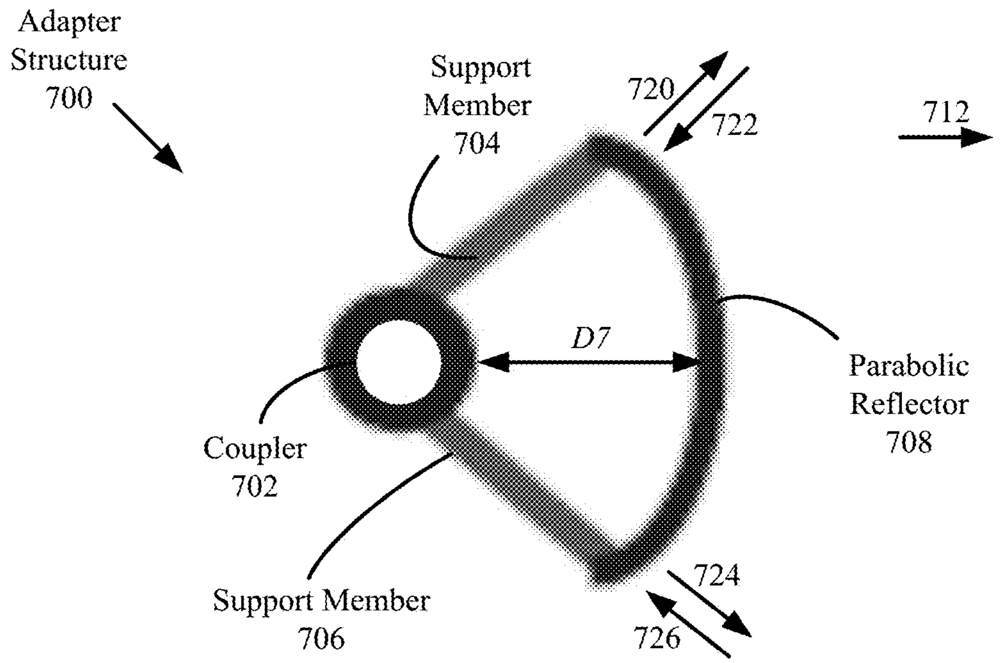
FIGS. 7A-7B (collectively referred to herein as "FIG. 7") provide illustrations showing yet another adapter structure.
Figure 7B:
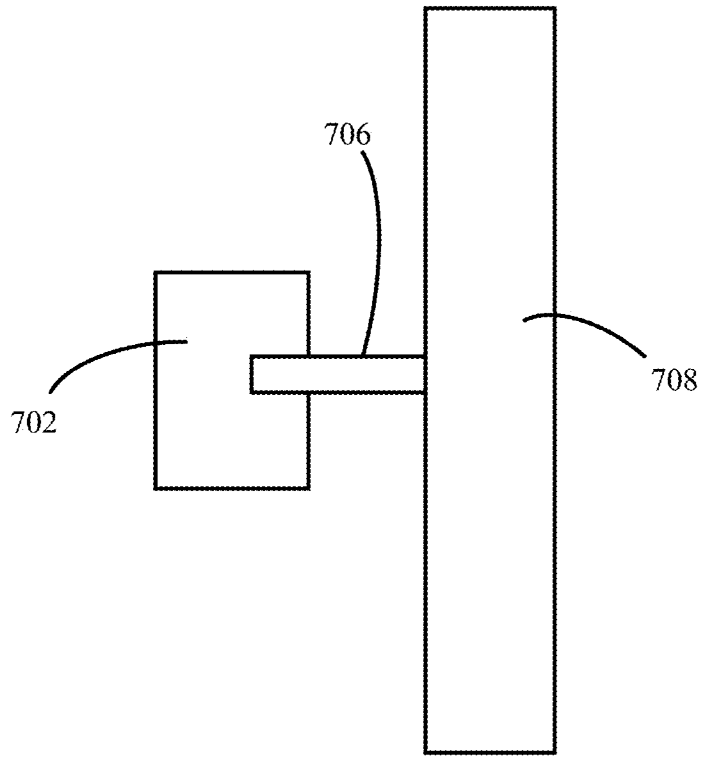

FIG. 7 provides an illustration of another structure 700 for a directional adaptor. A top view of the adapter structure 700 is provided in FIG. 7A, and a front view of the adapter structure 700 is provided in FIG. 7B.

The adapter structure 700 is configured to convert or otherwise transform an omni-directional antenna (e.g., omni-directional antenna 108 of FIG. 1) into a parabolic antenna. Accordingly, the adapter structure 700 comprises a coupler 702 configured to facilitate the coupling and decoupling of the adapter structure 700 to an antenna (e.g., antenna 108 of FIG. 1). Coupler 702 may be the same as, similar to or different than coupler 402 of FIG. 4.

At least one support member 704, 706 is provided to attach the coupler 702 to a parabolic reflector 708. The coupler 702 and support member(s) 704, 706 are formed of insulative material(s). The parabolic reflector 708 is provided to add gain by reflecting the energy produced at the drive antenna (e.g., antenna 108 of FIG. 1) and send it in a particular direction. The parabolic reflector 708 may be formed of a conductive material.

The coupler 702 and support member(s) 704, 706 are formed of insulative material(s). In some scenarios, the support member(s) 704, 706 and coupler 702 are integrally formed as a single piece, for example, via an injection molding process. In other scenarios, the support members 704, 706 and coupler 702 are separate pieces that are joined, attached, adhered and/or affixed to each other. A weld or an adhesive may, for example, be used to facilitate the coupling of the support member(s) 704, 706 and coupler 702.

The length, height and width of the parabolic reflector 708 are selected to tune the frequency in which the adapter structure 700 is able to operate while coupled to the drive antenna (e.g., antenna 108 of FIG. 1). In some scenarios, the parabolic reflector 708 may have a fixed size or a variable size. The reflector may also be interchangeable with other different sized reflectors. The frequency of the adapter structure 700 can also be tuned by changing the distance D7 between the coupler 702 and the parabolic reflector 708.

The distance D7 between the coupler 702 and the parabolic reflector 708 is selected based on the frequency in which the directional adapter is to operate. The distance D7 can be smaller or larger than that shown in FIG. 7. Nominally the distance D7 may be equal to or substantially similar to ¼λ. The distance D7 may be fixed or alternatively adjustable. In the adjustable scenario, the distance D7 can be changed by expanding and/or contracting the support members 704, 706. The expansion/contraction of the support members 704, 706 can be facilitated by using a structure in which the support member sub-parts can slide into and out of each other. The structure can include, but is not limited to, a telescoping structure. The support members 706, 704 are expanded by increasing their lengths respectively in directions 720, 724, and are contracted by decreasing their lengths respectively in directions 722, 726.

The curvature of the parabolic reflector 708 is selected based on a desired directionality of the antenna when used with the directional adapter. The smaller the curvature the less directional the antenna, and the larger the curvature the more directional the antenna. The curvature of the parabolic reflector 708 may be fixed in some scenarios or variable in other scenarios. In the fixed curvature scenarios, the parabolic reflector 708 may be interchangeable with other parabolic reflectors having different curvatures and/or sizes.

In the variable curvature scenarios, any known or to be known means for adjusting the curvature of an object can be used. For example, in some scenarios, the reflector comprises multiple parts that can be slid into each other and out from each other. Additionally or alternatively, the reflector can be made of a conductive material that can be bent or otherwise deformed to change the curvature without causing damage thereto. The present solution is not limited to the particulars of this example.

Figure 8A:
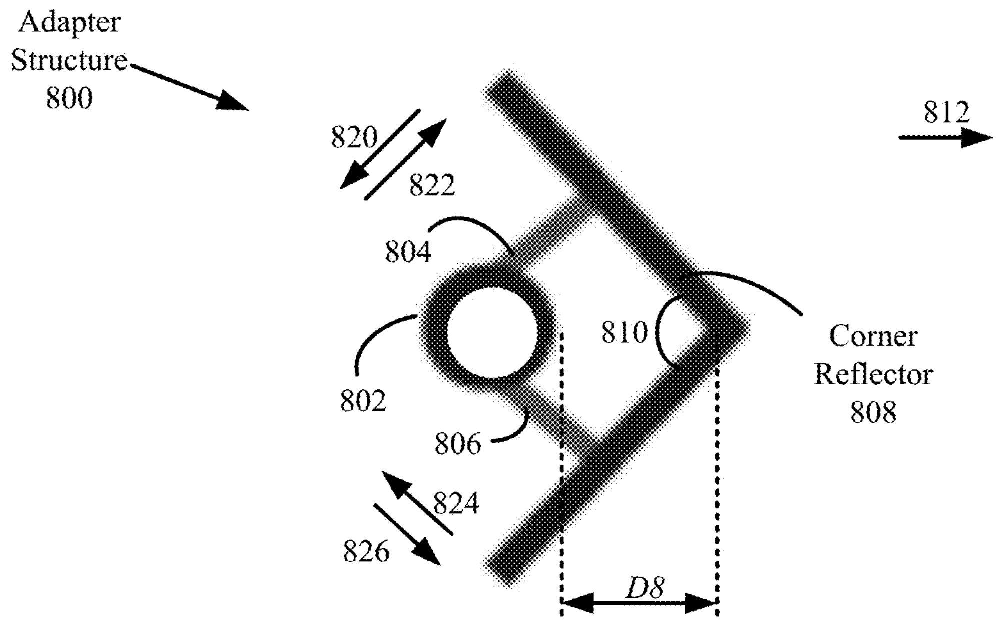
FIGS. 8A-8B (collectively referred to herein as "FIG. 8") provide illustrations showing yet another adapter structure.
Figure 8B:
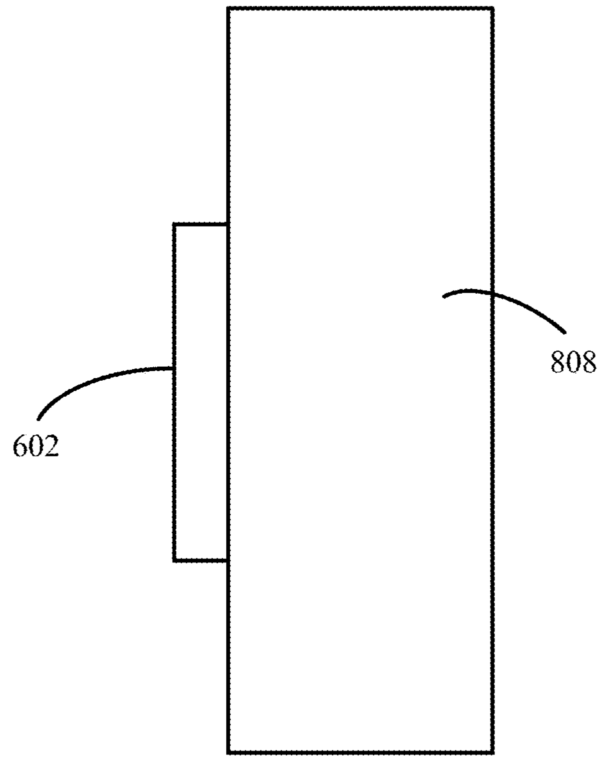

FIG. 8 provides an illustration of another structure 800 for a directional adaptor. A top view of the adapter structure 800 is provided in FIG. 8A, and a front view of the adapter structure 800 is provided in FIG. 8B. The adapter structure 800 is configured to convert or otherwise transform an omni-directional antenna (e.g., omni-directional antenna 108 of FIG. 1) into a corner antenna.

As shown in FIG. 8, the adapter structure 800 comprises a coupler 802 configured to facilitate the coupling and decoupling of the adapter structure 800 to an antenna (e.g., antenna 108 of FIG. 1). Coupler 802 may be the same as, similar to or different than coupler 402 of FIG. 4.

At least one support member 804, 806 is provided to attach the coupler 802 to a corner reflector 808. The coupler 802 and support member(s) 804, 806 are formed of insulative material(s). The corner reflector 808 is provided to add gain by reflecting the energy produced at the drive antenna (e.g., antenna 108 of FIG. 1) and send it in a particular direction. The corner reflector 808 may be formed of a conductive material.

The coupler 802 and support member(s) 804, 806 are formed of insulative material(s). In some scenarios, the support member(s) 804, 806 and coupler 802 are integrally formed as a single piece, for example, via an injection molding process. In other scenarios, the support members 804, 806 and coupler 802 are separate pieces that are joined, attached, adhered and/or affixed to each other. A weld or an adhesive may, for example, be used to facilitate the coupling of the support member(s) 804, 806 and coupler 802.

The length, height and width of the corner reflector 808 are selected to tune the frequency in which the adapter structure 800 is able to operate while coupled to the drive antenna (e.g., antenna 108 of FIG. 1). In some scenarios, the corner reflector 808 may have a fixed size or a variable size. The corner reflector may also be interchangeable with other different sized corner reflectors. The frequency of the adapter structure 800 can also be tuned by changing the distance D8 between the coupler 802 and the corner reflector 808.

The distance D8 between the coupler 802 and the corner reflector 808 is selected based on the frequency in which the directional adapter is to operate. The distance D8 can be smaller or larger than that shown in FIG. 8. Nominally the distance D8 is equal to or substantially similar to ¼λ. The distance D8 may be fixed or alternatively adjustable. In the adjustable scenario, the distance D8 can be changed by expanding and/or contracting the support members 804, 806. The expansion/contraction of the support members 804, 806 can be facilitated by using a structure in which the support member sub-parts can slide into and out of each other. The structure can include, but is not limited to, a telescoping structure. The support members 806, 804 are expanded by increasing their lengths respectively in directions 822, 826, and are contracted by decreasing their lengths respectively in directions 820, 824.

The angle 810 of the corner reflector 808 is selected based on a desired directionality of the antenna when used with the directional adapter. The larger the angle 810 the less directional the antenna, and the smaller the angle 810 the more directional the antenna. The angle 810 of the corner reflector 808 may be fixed in some scenarios or variable in other scenarios. In the fixed curvature scenarios, the corner reflector 808 may be interchangeable with other parabolic reflectors having different curvatures and/or sizes.

In the variable angle scenarios, any known or to be known means for adjusting the angle between two planar sidewalls can be used. For example, in some scenarios, the reflector comprises multiple parts that can rotate relative to each other. Additionally or alternatively, the reflector can be made of a conductive material that can be bent or otherwise deformed to change the angle without causing damage thereto. The present solution is not limited to the particulars of this example.

Figure 9A:
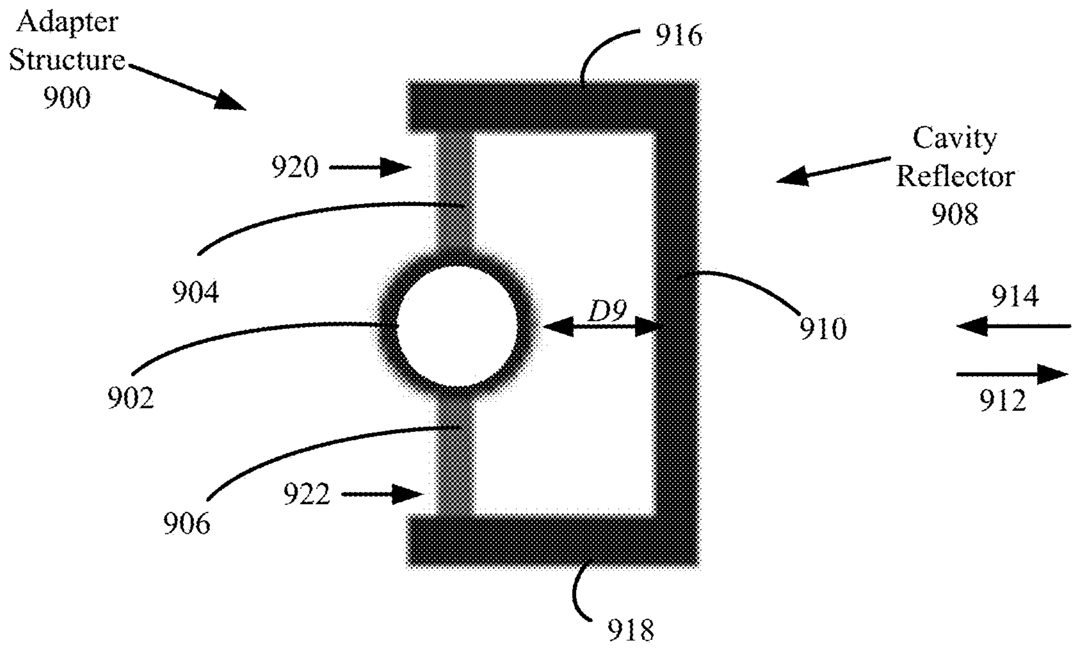
FIGS. 9A-9B (collectively referred to herein as "FIG. 9") provide illustrations showing yet another adapter structure.
Figure 9B:
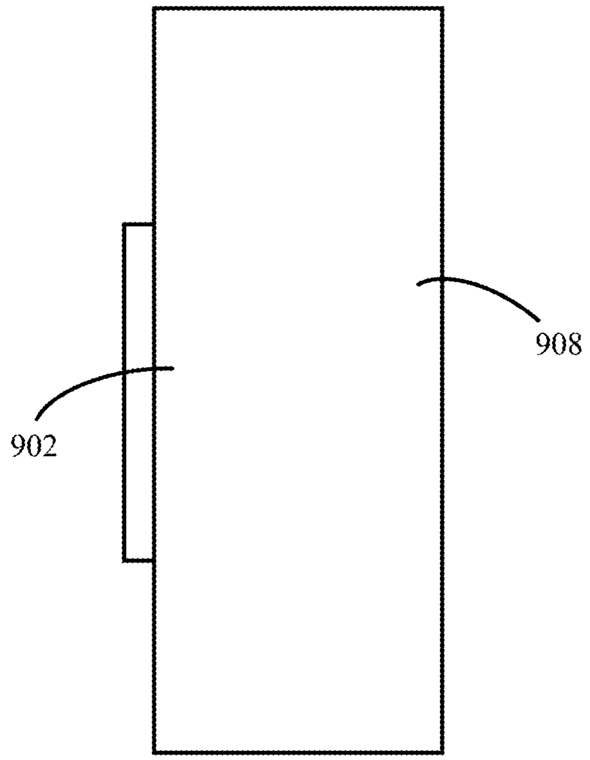

FIG. 9 provides an illustration of another structure 900 for a directional adaptor. A top view of the adapter structure 900 is provided in FIG. 9A, and a front view of the adapter structure 900 is provided in FIG. 9B. The adapter structure 900 is configured to convert or otherwise transform an omni-directional antenna (e.g., omni-directional antenna 108 of FIG. 1) into a cavity antenna.

As shown in FIG. 9, the adapter structure 900 comprises a coupler 902 configured to facilitate the coupling and decoupling of the adapter structure 900 to an antenna (e.g., antenna 108 of FIG. 1). Coupler 902 may be the same as, similar to or different than coupler 402 of FIG. 4.

At least one support member 904, 906 is provided to attach the coupler 902 to a cavity reflector 908. The coupler 902 and support member(s) 904, 906 are formed of insulative material(s). The cavity reflector 908 has a generally U-shape and is provided to add gain by reflecting the energy produced at the drive antenna (e.g., antenna 108 of FIG. 1) and send it in a particular direction. The U-shape is defined by three sidewalls 910, 916, 918, wherein each sidewall 916, 918 extends perpendicular to sidewall 910 and extends in direction 914 away from sidewall 910. The cavity reflector 908 may be formed of a conductive material.

The coupler 902 and support member(s) 904, 906 are formed of insulative material(s). In some scenarios, the support member(s) 904, 906 and coupler 902 are integrally formed as a single piece, for example, via an injection molding process. In other scenarios, the support members 904, 906 and coupler 902 are separate pieces that are joined, attached, adhered and/or affixed to each other. A weld or an adhesive may, for example, be used to facilitate the coupling of the support member(s) 904, 906 and coupler 902.

The overall size of the cavity reflector 908 are selected to tune the frequency in which the adapter structure 900 is able to operate while coupled to the drive antenna (e.g., antenna 108 of FIG. 1). In some scenarios, the cavity reflector 908 may have a fixed size or a variable size. The cavity reflector may also be interchangeable with other different sized cavity reflectors. The frequency of the adapter structure 900 can also be tuned by changing the distance D9 between the coupler 902 and sidewall 910 of the cavity reflector 908.

The distance D9 between the coupler 902 and the cavity reflector 908 is selected based on the frequency in which the directional adapter is to operate. The distance D9 can be smaller or larger than that shown in FIG. 9. The distance D9 may be fixed or alternatively adjustable. In the adjustable scenario, the distance D9 can be changed by moving the support member(s) 904, 906 in direction 912 towards from sidewall 910 of the cavity reflector 908 and moving the support member(s) 904, 906 in direction 914 away from sidewall 910 of the cavity reflector 908. This movement can be facilitated by, for example, tracks (not visible in FIG. 5) formed in sidewalls 916, 918 of the cavity reflector 908 and/or rollers (not visible in FIG. 5) provided at distal ends 920, 922 of the support member(s) 904, 906. Other techniques for allowing movement of the support member(s) 904, 906 relative to the cavity reflector 908 can be used here. The further the drive antenna is moved in direction 914 via the support member(s) 904, 906 the smaller the nulls are in the directional antenna pattern, and the further the drive antenna is moved in direction 912 via the support member(s) 904, 906 the larger the nulls are in the directional antenna pattern.

Figure 10A:
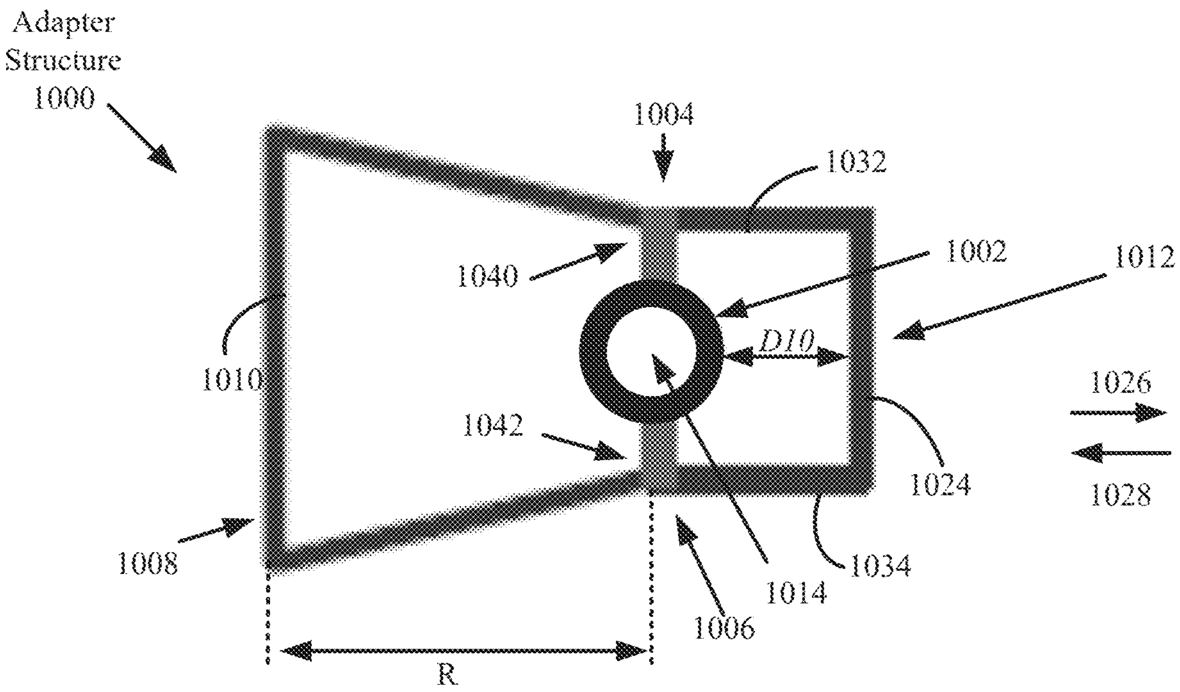
FIGS. 10A-10B (collectively referred to herein as "FIG. 10") provide illustrations showing yet another adapter structure.
Figure 10B:
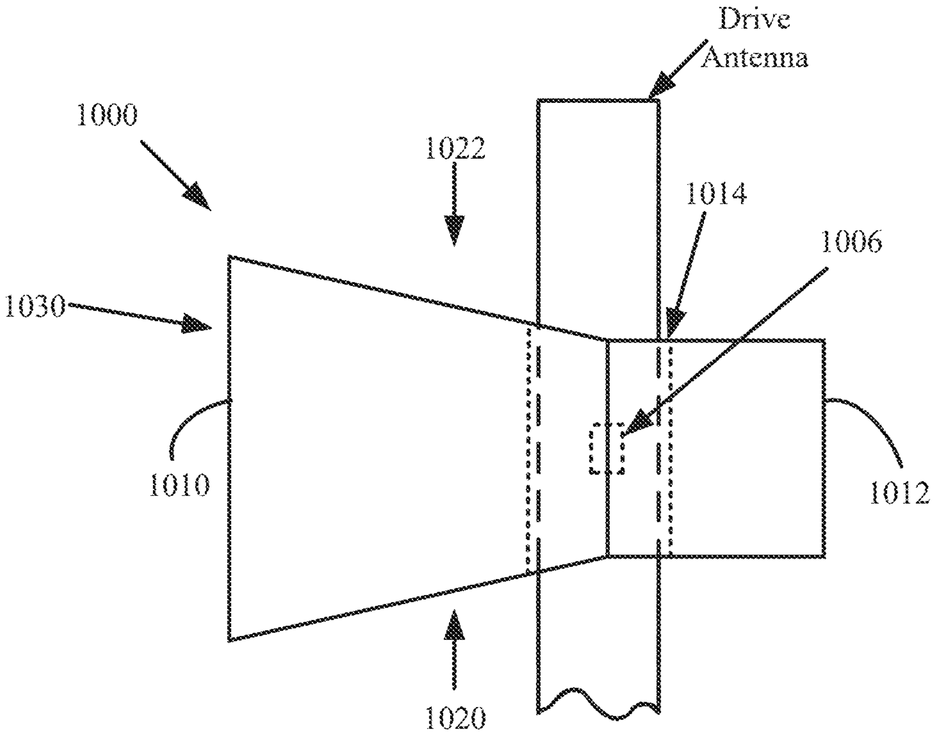

FIG. 10 provides an illustration of another structure 1000 for a directional adaptor. A top view of the adapter structure 1000 is provided in FIG. 10A, and a front view of the adapter structure 1000 is provided in FIG. 10B. The adapter structure 1000 is configured to convert or otherwise transform an omni-directional antenna (e.g., omni-directional antenna 108 of FIG. 1) into a horn antenna.

As shown in FIG. 10, the adapter structure 1000 comprises a coupler 1002 configured to facilitate the coupling and decoupling of the adapter structure 1000 to a drive antenna (e.g., antenna 108 of FIG. 1). Coupler 1002 may be the same as, similar to or different than coupler 402 of FIG. 4. Coupler 1002 comprises a through-hole 1014 sized and shaped to receive the drive antenna. During use of the adapter structure, the drive antenna extends through the through-hole 1014 from a first side 1020 of the adapter structure to a second side 1022 of the adapter structure, as illustrated in FIG. 7B.

At least one support member 1004, 1006 is provided to attach the coupler 1002 to a horn structure 1008. The coupler 1002 and support member(s) 1004, 1006 are formed of insulative material(s). The horn structure 1008 is provided to collect radio waves and cause them to propagate similar to a beam.

The coupler 1002 and support member(s) 1004, 1006 are formed of insulative material(s). In some scenarios, the support member(s) 1004, 1006 and coupler 1002 are integrally formed as a single piece, for example, via an injection molding process. In other scenarios, the support members 1004, 1006 and coupler 1002 are separate pieces that are joined, attached, adhered and/or affixed to each other. A weld or an adhesive may, for example, be used to facilitate the coupling of the support member(s) 1004, 1006 and coupler 1002.

The horn structure 1008 comprises a waveguide portion 1012 connected to a flared horn portion 1010. Portions 1010, 1012 are configured to direct radio waves in a beam. Portions 1010, 1012 may be formed of a conductive material.

The dimensions of the horn opening 1030, the horn length R and the dimensions the waveguide portion 1012 are selected to provide a particular a radiation pattern when the adapter structure 1000 is used with an omni-directional antenna (e.g., antenna 108 of FIG. 1). In some scenarios, the size and/or shape of the waveguide portion 1012 and/or horn portion 1010 are fixed, while in other scenarios one or both portions 1010, 1012 may have a variable size and/or a variable shape. The horn structure 1008 may also be interchangeable with other different sized horn structures, and/or the waveguide portion 1012 may also be interchangeable with other different sized waveguide portions.

The distance D10 between the coupler 1002 and a sidewall 1024 of the waveguide portion 1012 is selected in accordance with a given application. The distance D10 can be smaller or larger than that shown in FIG. 10. The distance D10 may be fixed or alternatively adjustable.

In some adjustable scenarios, the distance D10 can be changed by moving the support member(s) 1004, 1006 in direction 1026 towards from sidewall 1024 of the waveguide portion 1012 and moving the support member(s) 1004, 1006 in direction 1028 away from sidewall 1024 of the waveguide portion 1012. This movement can be facilitated by, for example, tracks (not visible in FIG. 10) formed in sidewalls 1034, 1036 of the waveguide portion 1012 and/or rollers (not visible in FIG. 10) provided at distal ends 1040, 1042 of the support member(s) 1004, 1006. Other techniques for allowing movement of the support member(s) 1004, 1006 relative to the waveguide portion 1012 can be used here.

In those or other adjustable scenarios, the distance D10 can be changed by expanding or collapsing the waveguide portion 1012. The waveguide portion 1012 may, for example, be designed as a telescoping portion of the adapter structure 1000. Alternatively, the waveguide portion 1012 is an interchangeable component that can be replaced with other waveguide portions having different sizes.

Figure 11:
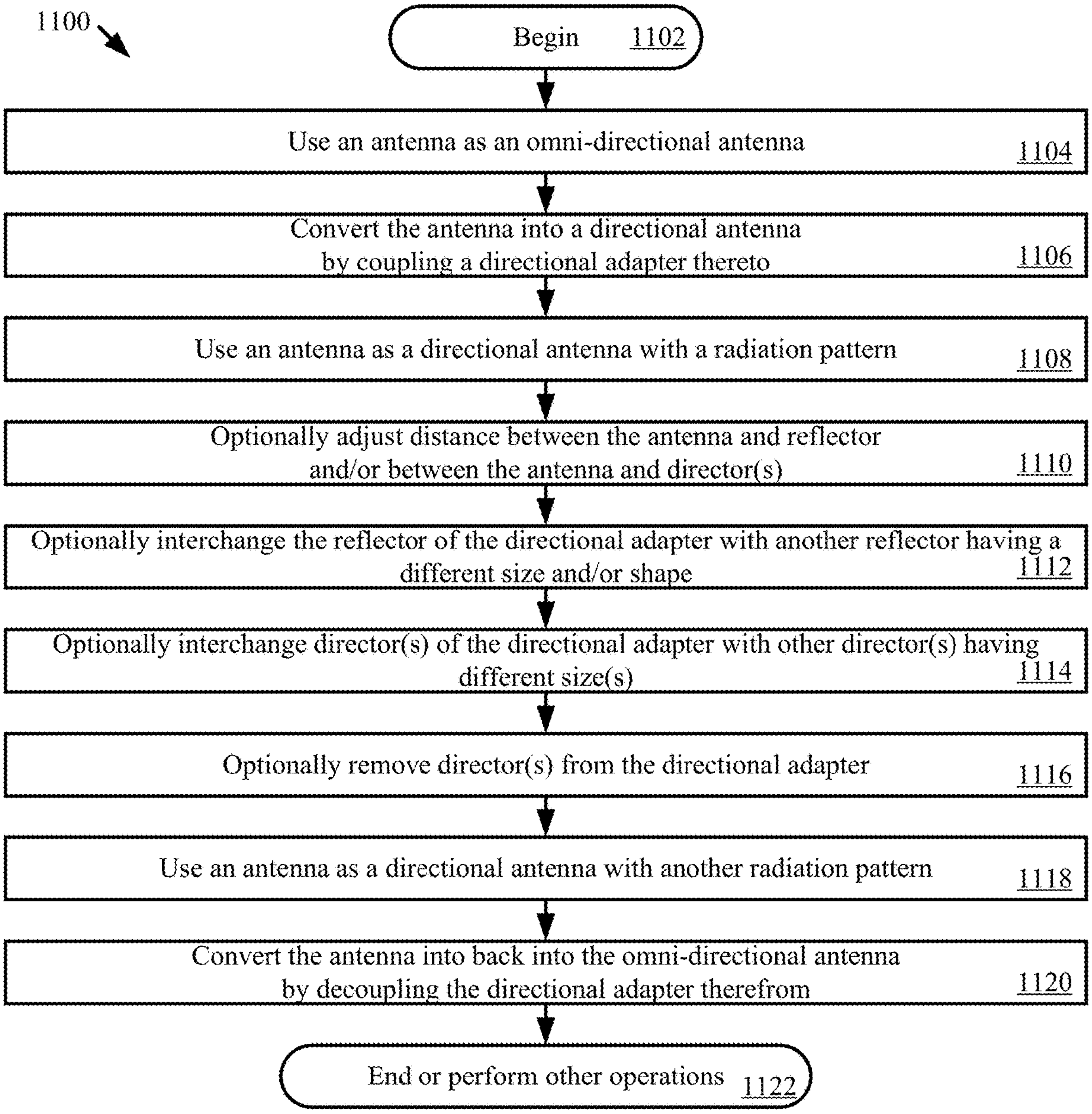
FIG. 11 provides a flow diagram of an illustrative method for operating an antenna.

Referring now to FIG. 11, there is provided a flow diagram of an illustrative method 1100 for operating an antenna system. Method 1100 begins with 1102 and continues to 1104 where an antenna (e.g., antenna 108 of FIG. 1) operates as an omni-directional antenna to radiate equal radio power in all directions perpendicular to a center axis (e.g., center axis 110 of FIG. 1) of the antenna. The antenna is converted into a directional antenna by coupling a directional adapter (e.g., directional adapter 200 of FIG. 2) thereto, as shown by block 1106. The directional antenna can include, but is not limited to, a yagi antenna, a parabolic antenna, a reflector antenna, a horn antenna, a corner reflector antenna, or a cavity antenna. In this regard, the directional adapter may comprise a reflector (e.g., reflector 414 of FIG. 4, 608 of FIG. 6, 708 of FIG. 7, 808 of FIG. 8, or 908 of FIG. 9) that is offset a first distance (e.g., distance D3 of FIG. 4, D6 of FIG. 6, D7 of FIG. 7, D8 of FIG. 8, or D9 of FIG. 9) in a first direction (e.g., direction 454 of FIG. 4, 612 of FIG. 6, 712 of FIG. 7, 812 of FIG. 8, or 912 of FIG. 9) from the antenna when the directional adapter is coupled thereto. The directional adapter may also comprise at least one director (e.g., director 410 of FIG. 4) that is offset a second distance (e.g., distance D2 of FIG. 4) in an opposing second direction (e.g., direction 452 of FIG. 4) from the antenna when the directional adapter is coupled thereto. The directional adapter may further comprise another director (e.g., director 412 of FIG. 4) that is offset a third distance (e.g., distance D of FIG. 4B) in the opposing second direction from the antenna when the directional adapter is coupled thereto. The third distance greater than the second distance.

The antenna is then used in 1108 to radiate greater radio wave power in a specific direction. Passive components of the directional adapter may optionally be changed and/or removed in the field as shown by blocks 1110-1116. Blocks 1110-1116 involve: changing the radiation pattern of the directional antenna by adjusting a distance between the antenna and the reflector of the directional adapter and/or adjusting a distance between the antenna and director(s) of the directional adapter; selectively interchanging the reflector of the directional adapter with another reflector having a different size and/or shape and/or selectively interchanging the director(s) of the directional adapter with other director (s) having different size(s); and/or removing the director(s) from the directional adapter to, for example, convert the antenna from the directional antenna of a yagi type to another directional antenna of a reflector type. The antenna may then be used again in 1118 as a directional antenna with another radiation pattern.

Thereafter, the antenna may be converted back into the omni-directional antenna in block 1120 by decoupling the directional adapter therefrom. Subsequently, method 1100 continues with block 1122 where its ends or other operations are performed (e.g., return to 1104).

In view of the forgoing, the present solution concerns an antenna system. The antenna system comprises: an omni-directional antenna element (e.g., antenna 108 of FIG. 1); and a directional adapter (e.g., directional adapter 200 of FIG. 2) having an electromagnetic reflector. The directional adapter is detachably coupled to the omni-directional antenna element. The electromagnetic reflector is offset from the omni-directional antenna element. The directional adapter has a director offset from the omni-directional antenna element and on the opposite side of the electromagnetic reflector. The directional adapter has a structural element disposed between the reflector and the omni-directional antenna element. The structural element is generally electromagnetically nonconductive. The directional adapter is detachably coupled indirectly to the omni-directional antenna element.

The present solution also concerns an antenna adapter (e.g., directional adapter 200 of FIG. 2) comprises a mechanical coupler (e.g., coupler 402 of FIG. 4) attachable to an antenna (e.g., antenna 108 of FIG. 1 and an electromagnetic reflector (e.g., reflector 414 of FIG. 4) offset from the mechanical coupler. The antenna adapter is configured to be coupled to the antenna to convert a radiation pattern from an omni-directional antenna radiation pattern (e.g., radiation pattern 300 of FIG. 3) to a directional antenna radiation pattern (e.g., radiation pattern 302 of FIG. 3), and configured to be decoupled from the antenna to convert the radiation pattern back into the omni-directional antenna radiation pattern. The antenna can include, but is not limited to, an omni-directional wideband antenna.

The antenna adapter may be configured to convert the antenna into one or more of a yagi antenna, a parabolic antenna, a reflector antenna, a horn antenna, a corner reflector antenna, and/or a cavity antenna. In this regard, the antenna adapter comprises a reflector (e.g., reflector 414 of FIG. 4, 608 of FIG. 6, 708 of FIG. 7, 808 of FIG. 8, or 908 of FIG. 9) that is offset a first distance (e.g., distance D3 of FIG. 4, D6 of FIG. 6, D7 of FIG. 7, D8 of FIG. 8, or D9 of FIG. 9) in a first direction (e.g., direction 454 of FIG. 4, 612 of FIG. 6, 712 of FIG. 7, 812 of FIG. 8, or 912 of FIG. 9) from the antenna when the antenna adapter is coupled thereto. The reflector may optionally be configured to be interchanged with another reflector having a different size and/or shape. The antenna adapter may additionally comprises at least one director (e.g., director 410 of FIG. 4) that is offset a second distance (e.g., distance D2 of FIG. 4) in an opposing second direction (e.g., direction 452 of FIG. 4) from the antenna when the antenna adapter is coupled thereto. The director(s) may be configured to be removed from the antenna adapter to, for example, (i) convert the antenna from the directional antenna of a yagi type to another directional antenna of a reflector type and/or (ii) be interchanged with another director having different size(s). The antenna adapter may further comprises another director (e.g., direction 412 of FIG. 4) that is offset a third distance (e.g., distance D of FIG. 4B) in the opposing second direction from the antenna when the antenna adapter is coupled thereto. The third distance may be greater than the second distance.

In some scenarios, the directional antenna radiation pattern is changeable by adjusting a distance between the antenna and a reflector of the antenna adapter and/or adjusting a distance between the antenna and at least one director of the antenna adapter. Additionally or alternatively, the antenna adapter comprises an aperture (e.g., aperture 1014 of FIG. 10) extending therethrough that is sized and shaped to slidingly receive the antenna. The aperture may also be configured to maintain the adapter structure (e.g., adapter structure 1000) at a particular position relative to the antenna throughout use of the antenna system.

The present solution also concerns implementing systems and methods for operating an antenna. The methods comprise: using the antenna as an omni-directional antenna to radiate equal radio power in all directions perpendicular to a center axis of the antenna; converting the antenna into a directional antenna by coupling a directional adapter thereto; using the antenna, with the directional adapter coupled thereto, to radiate greater radio wave power in a specific direction; and converting the antenna back into the omni-directional antenna by decoupling the directional adapter therefrom.

The antenna adapter may be configured to convert the antenna into one or more of a yagi antenna, a parabolic antenna, a reflector antenna, a horn antenna, a corner reflector antenna, and a cavity antenna. The antenna adapter may comprise: a reflector that is offset a first distance in a first direction from the antenna when the antenna adapter is coupled thereto; at least one director that is offset a second distance in an opposing second direction from the antenna when the directional antenna adapter is coupled thereto; and/or another director that is offset a third distance in the opposing second direction from the antenna when the antenna adapter is coupled thereto, the third distance greater than the second distance.

We claim:

1. An antenna adapter, comprising:

a mechanical coupler coupled to support members and attachable to an antenna; and an electromagnetic reflector coupled to the support members so as to be offset from the mechanical coupler in a first direction;

wherein the antenna adapter is configured to be coupled to the antenna to convert a radiation pattern from an omni-directional antenna radiation pattern to a directional antenna radiation pattern, and configured to be decoupled from the antenna to convert the radiation pattern back into the omni-directional antenna radiation pattern;

wherein the support members extend between the mechanical coupler and respective sides of the electromagnetic reflector and have lengths that are variable; and wherein the electromagnetic reflector has a variable size that is increased by applying a force thereto as the lengths of the support members expand.

2. The antenna adapter according to claim 1, wherein the antenna adapter is further configured to convert the antenna into one or more of a yagi antenna, a parabolic antenna, a reflector antenna, a horn antenna, a corner reflector antenna, and a cavity antenna.

3. The antenna adapter according to claim 1, wherein the antenna adapter comprises a reflector that is offset a first distance in a first direction from the antenna when the antenna adapter is coupled thereto.

4. The antenna adapter according to claim 3, wherein the electromagnetic reflector is configured to be interchanged with another electromagnetic reflector having a different size and/or shape.

5. The antenna adapter according to claim 3, wherein the antenna adapter further comprises at least one director that is offset a second distance in an opposing second direction from the antenna when the antenna adapter is coupled thereto.

6. The antenna adapter according to claim 5, wherein the at least one director is configured to be removed from the antenna adapter to further convert the antenna from the directional antenna of a yagi type to another directional antenna of a reflector type.

7. The antenna adapter according to claim 5, wherein the at least one director is configured to be interchanged with another director having a different size.

8. The antenna adapter according to claim 5, wherein the antenna adapter further comprises another director that is offset a third distance in the opposing second direction from the antenna when the antenna adapter is coupled thereto, the third distance greater than the second distance.

9. The antenna adapter according to claim 1, wherein:

the antenna adapter comprises at least one director coupled to the support member so as to be offset from the mechanical coupler in the opposing second direction; and the directional antenna radiation pattern is changeable by adjusting a distance between the antenna and the electromagnetic reflector of the antenna adapter and/or adjusting a distance between the antenna and the at least one director of the antenna adapter.

10. The antenna adapter according to claim 1, wherein a curvature or an angle of the electromagnetic reflector is variable.

11. The antenna adapter according to claim 10, wherein the electromagnetic reflector is made of a conductive material that can be bent or deformed to change the curvature or the angle.

12. The antenna adapter according to claim 1, wherein an outer most edge of the mechanical coupler is aligned with a center of the antenna adapter and the mechanical coupler extends from the center of the antenna adapter in the first direction towards the electromagnetic reflector.

* * * * *